Dec. 24, 1968
R. H. THORNER
3,417,836
VEHICLE THROTTLE CONTROL MECHANISM
Filed Oct. 22, 1965
3 Sheets-Sheet 1
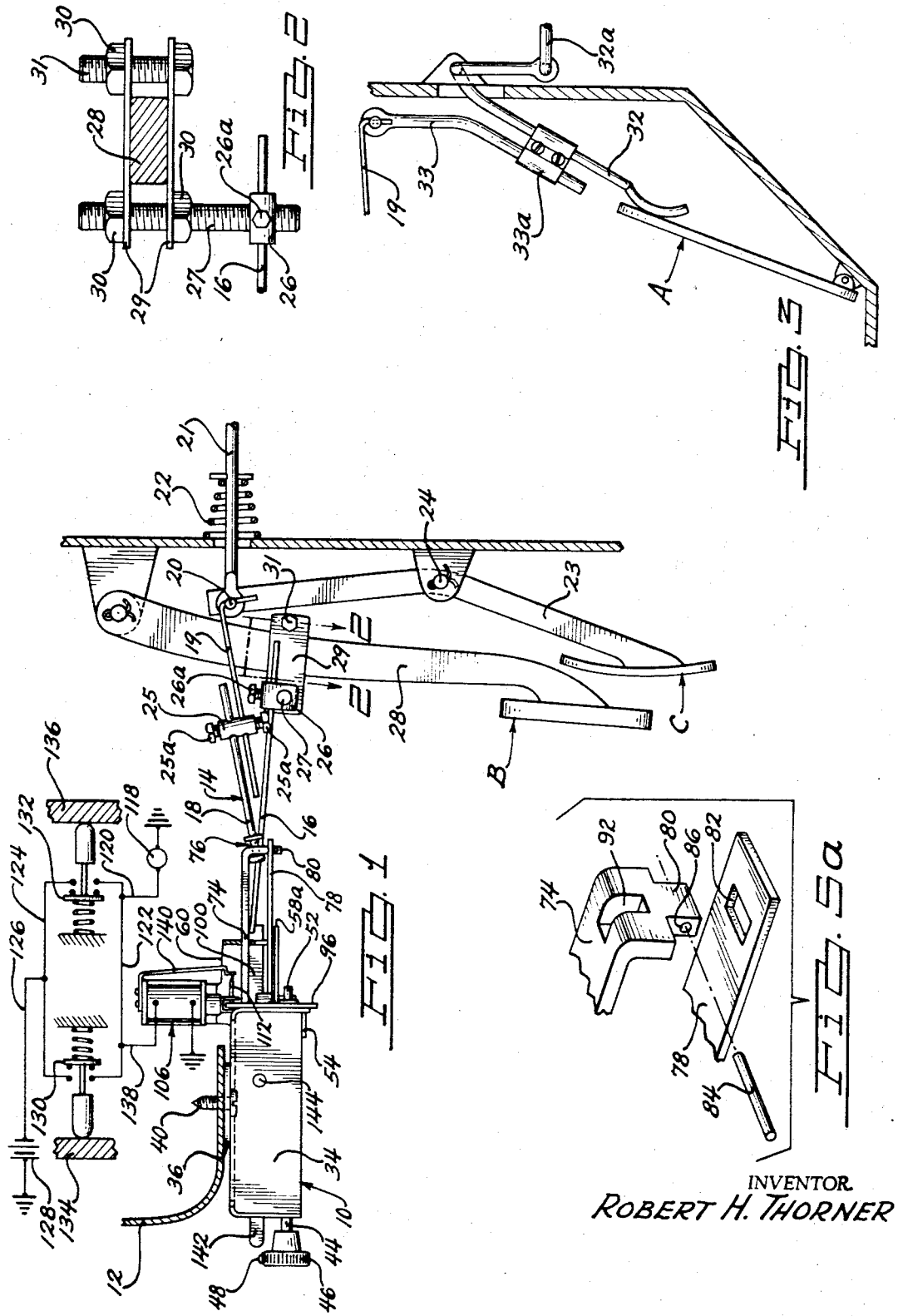
INVENTOR.
ROBERT H. THORNER

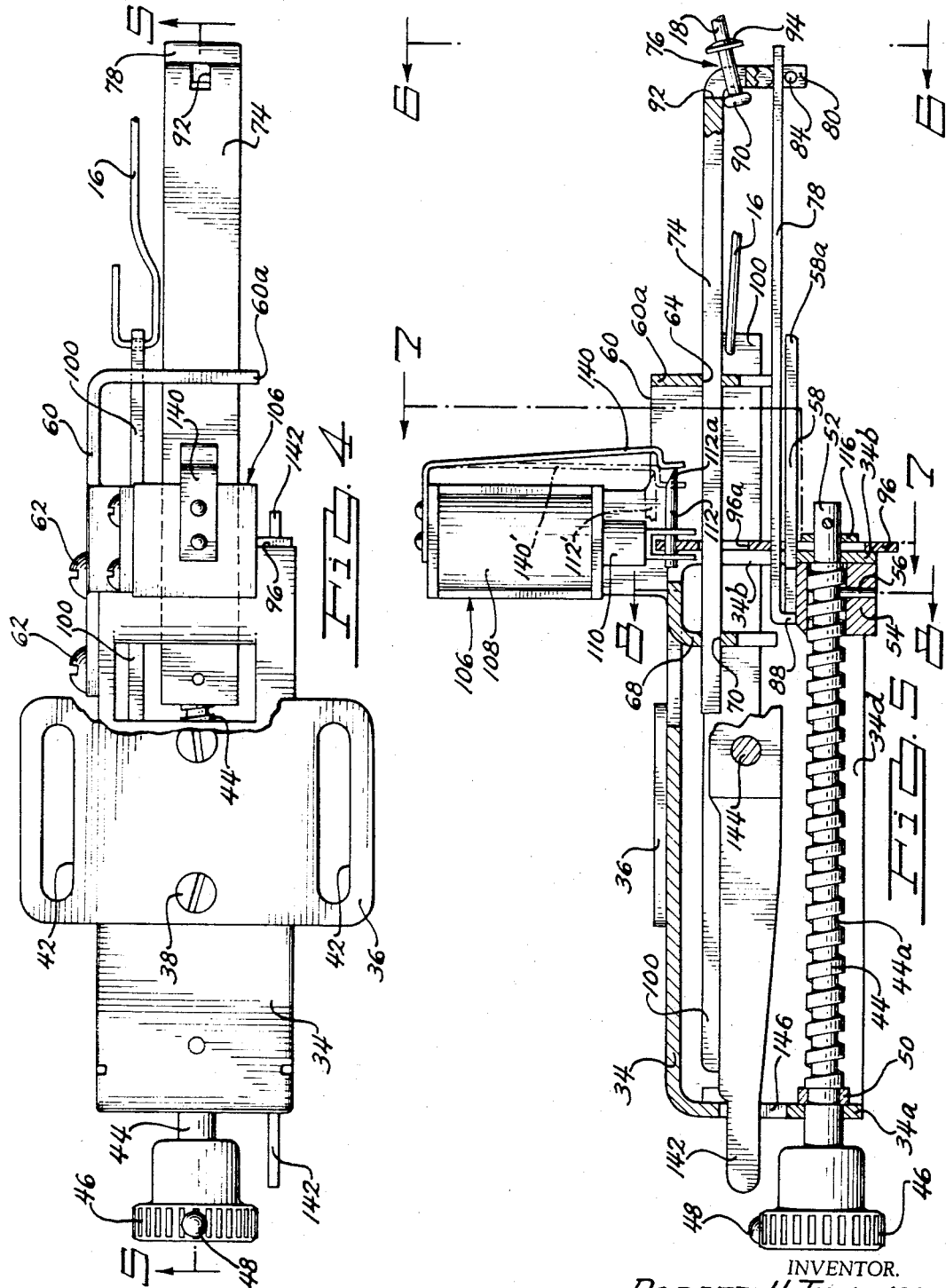

Dec. 24, 1968    R. H. THORNER    3,417,836
VEHICLE THROTTLE CONTROL MECHANISM
Filed Oct. 22, 1965    3 Sheets-Sheet 3

INVENTOR.
ROBERT H. THORNER

United States Patent Office 3,417,836
Patented Dec. 24, 1968

3,417,836
VEHICLE THROTTLE CONTROL MECHANISM
Robert H. Thorner, 8750 W. Chicago Blvd.,
Detroit, Mich. 48204
Filed Oct. 22, 1965, Ser. No. 500,984
36 Claims. (Cl. 180—109)

ABSTRACT OF THE DISCLOSURE

The main disclosure herein comprises a manual speed control in which the driver must "turn on" the device only each time the vehicle is driven. Thereafter, the device is rendered inactive by depressing the brake pedal; and the speed control is reactivated automatically without manual reset upon again depressing the accelerator until a click is heard indicating reactivation. The speed control is rendered safe by automatically "locking out" the device whenever there is a change in drivers, controlled by the vehicle door-operated dome light switch in one form; and the speed is selected by the sense of touch enabling the driver to keep his sight on the road at all times. These functions are controlled by a single guide member operated either by the brake pedal, door-operated solenoid or a manual lever.

---

This invention relates to an improvement in a speed control device to position the control means or throttle of an automotive vehicle whereby the driver may rest his foot and leg during sustained driving periods. In one form, the control device may be associated directly with the accelerator pedal linkage preferably inside the driver's compartment which permits cooperation with the brake-actuating mechanism, and which device will release from an "active" or engaged status to an "inactive" or "inoperative" status when certain conditions occur.

One of the main features of the speed control device of the present invention is to provide a unique combination of elements which require manual activation of the device by the vehicle-driver only once each time he initiates operation of the vehicle, and re-activation or engagement following each brake-release actuation is thereafter entirely automatic. The instant invention includes in the speed control device novel restraining means which accomplish the foregoing desirable result, such that the device is automatically locked out when the driver leaves the vehicle or otherwise inactivates same, and is applicable to hill-compensating speed control devices as well as for non-compensating hand throttles. In order to enable such desirable automatic activation or engagement with safety, the restraining means is provided to automatically render the device inoperative by locking out the speed control device whenever a movable element of the vehicle such as a door (at least on the driver's side) is operated by the driver incident to inactivation of the vehicle, preferably whenever there is a change of drivers.

Safety means are included to hold the speed control device in its inoperative status after the vehicle is started, so that the throttle-controlling action of the device must be deliberately initiated manually by the vehicle-driver each time the vehicle is first activated, being substantially automatic thereafter. I have found this form of the device to be by far the most useful and satisfying operation of any hand throttle, because it extends its use to boulevard and city driving (on main streets) in addition to highway driving. However, such desirable automatic activation is of practical utility only providing the system is completely safe when placed in the hands of the public in mass quantities. Accordingly, it is highly desirable for the speed control device automatically to lock out or be held out of operation each time there is a change of drivers, for example while the engine is idling, which is accomplished by the above-mentioned restraining means. This situation occurs with some frequency, for example when a vehicle is left at a parking lot with the engine idling, waiting for an attendant to park the car. If the hand throttle does not lock out automatically incident to a change of drivers while the engine is idling, then the attendant might be surprised, not knowing the device will be activated automatically if he opens the throttle sufficiently. The surprise element in this situation might be hazardous and cause severe car damage or bodily injury to bystanders, particularly if the device is set for turnpike speeds such as 75 m.p.h.

A primary object of the present invention is to provide an improved speed control device for an automotive vehicle which is simple in construction, and which requires hand initiation by the vehicle-driver only once each time he enters the vehicle to operate same, in which re-engagement of the device, after braking the car, is entirely automatic and incident to normal depression of the accelerator pedal.

An additional object of the present invention is to provide an improved speed control device for an automotive vehicle as described in the preceding paragraph, and which device is automatically rendered inoperative and held out of further operation each time there is a change of drivers, for example while the vehicle-engine is idling.

Speed control devices of the general type to which the present invention is directed are disclosed, by way of example, in some of my prior patents, such as U.S. Letters Patent Nos. 3,168,933, 3,168,942 and 3,168,943. Various desirable results can be obtained when using my prior devices disclosed in these patents. However, in recent years the design trend of automotive passenger cars has been to lower the vehicles and generally to restrict the space under and in back of the instrument panel. Also, the demand for this restricted space has increased because of numerous accessories, such as air conditioning equipment for example. Since the present invention is preferably installed in the driver's compartment, this trend is significant.

It is one of the primary objects of the present invention to provide a simplified control device which incorporates desirable features of my different prior devices as well as new features not previously taught, and which simplified control device provides a more universal application to a large number of different makes and models of automotive vehicles now being manufactured.

It is another important object of the present invention to provide an improved control device of the foregoing character which is constructed and arranged so that it can be installed more easily, and so that the adjustments which must be made at the time of installation are minimized and simpler.

It is still another object of the present invention to provide an improved automotive speed control device which is constructed and arranged so that maximum safety is realized when it is in use.

Another object of the present invention is to provide an improved speed control device for an automotive vehicle as described in the preceding paragraphs which includes a rotatable speed adjustment knob having a single tactile indicator, and which also includes means to provide sufficiently fast movement of the throttle per turn of the knob to cover the entire useful speed range in about two turns or less by feeling the rotary positions of the tactile indicator, and which provides audible means for indicating to the vehicle-driver when automatic engagement occurs, as described in preceding paragraphs.

Another object of the present invention is to provide an improved speed control device for an automotive vehicle as described in the preceding paragraphs which is inactivated solely by mechanical means operated by the vehicle brake-actuating means, and which includes restraining means automatically to render the device inoperative whenever the vehicle is not in operation.

Other objects and advantages of the invention will become apparent from the following description and from the accompanying drawings, in which:

FIGURE 1 is an elevational view of one form of the invention as seen from the driver's right side, the device being shown in its active or engaged position, with certain vehicle parts being diagrammatically indicated in section, together with a diagram of an electrical circuit and switch operations therefor;

FIGURE 2 is a fragmentary sectional view taken on the line 2—2 of FIG. 1, showing one modification of a means for connecting the speed control device to a vehicle brake pedal;

FIGURE 3 is a fragmentary sectional view of a conventional, but different, accelerator construction from that shown in FIG. 1, and a modified linkage for attachment to the speed control device is partially shown;

FIGURE 4 is an enlarged top plan view illustrating a speed control device embodying the present invention;

FIGURE 5 is a sectional view taken on the line 5—5 of FIG. 4, showing the speed control device in an operative position, and also showing in phantom the position of the device when in an inoperative position;

FIGURE 5a is an exploded perspective view of an important detail of the control device;

Figure 6:
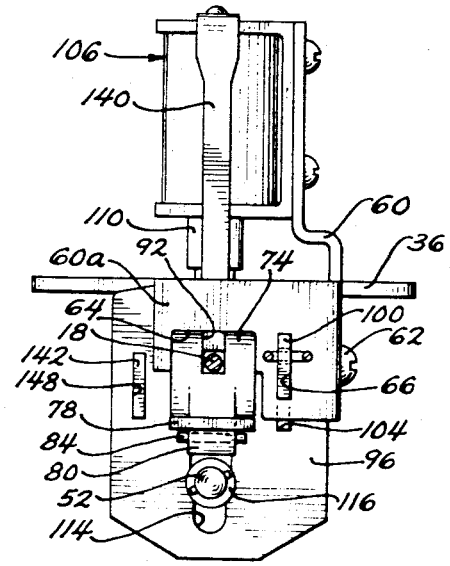
FIGURE 6 is an end elevational view, partly in section, taken on the line 6—6 of FIG. 5.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of descriptin and not limitation.

According to the present invention, restraining means are provided to render the speed control device inoperative whenever there is a change of drivers. In the form shown herein, the restraining means utilizes the electric light circuit in the vehicle which includes the dome light and the switches located at the doors of the vehicle for energizing the dome light when the doors are opened. As will be described, this restraining means is employed to render the speed control device inoperative after the door has been opened so that the speed control device will necessarily have to be placed in an operative condition again by conscious effort of the driver after the driver has closed the doors, before it can function to hold the accelerator pedal in any desired position. Thus, in the illustrated form of the invention, the speed control device is initally in an inoperative status after the door of the vehicle has been opened by the vehicle-driver whenever he leaves (or enters) the vehicle. Manual means must then be actuated by the driver at least once after he enters the vehicle to set the device in an operative but inactive status ready for final activation. The vehicle-driver can then effect at any time the desirable automatic activation of the speed control device to establish the vehicle speed. The device can be moved to an active position at any time after it has first been placed in an operative but inactive status. If the device is set for a position corresponding to the desired speed above that at which the vehicle is moving, the device will automatically engage or be rendered active as soon as the vehicle driver has depressed the accelerator to a position corresponding to such desired vehicle speed. Thereafter, the device will maintain the set position wherein the driver may remove his foot from the accelerator.

The device remains in the active status even though the vehicle-driver depresses the accelerator to increase speed, as for passing another vehicle, and the control means returns to the set position after the driver removes his foot from the accelerator. The speed control device will be rendered inactive but not inoperative merely by depressing the brake pedal; but the device *automatically* assumes the active or engaged position again without additional manual effort by the vehicle-driver as soon as the driver has again depressed the accelerator to the set position and removes his foot from the accelerator, even if the vehicle speed has not reached the speed corresponding to the set speed. In this latter event, the vehicle automatically accelerates slowly to the set speed if the driver does not touch the accelerator, but the driver can cause a more rapid acceleration by temporarily depressing the accelerator and then remove his foot from the accelerator.

The speed control device can be rendered completely inoperative so that it requires deliberate manual effort by the driver before it can again function as a speed control device. This inoperating action can be accomplished in either of two ways, one being manually selective and the other being automatic. Firstly, the device can be rendered inoperative selectively by the vehicle driver at any time by manual means to be described. Secondly, if the driver forgets to use the manual control when inactivating the vehicle, the device is automatically rendered inoperative as a result of operation of an element of the vehicle, such as one of the doors, which operation occurs "automatically" whenever the vehicle-driver leaves the vehicle. Thus, the element is "automatic" in the sense that it always is operated by the driver without extra conscious effort whenever he inactivates the vehicle and entirely incident thereto. With either of these two means for rendering the device inoperative, the speed control device remains inoperative until and unless the same or another driver positively and knowingly reactivates the device in a manner to be described so that the new driver is not dangerously surprised by automatic engagement or activation if the device were not rendered inoperative by one of these two means. Thus this highly desirable automatic activation characteristic is made possible from a practical standpoint by the restraining means which is the main reason for the latter's inclusion in the inventive combination.

While the foregoing operation is produced in my prior devices, particularly as shown in Patent No. 3,168,933, these highly desirable features are accomplished in the present invention with a vast improvement in the nicety of operation; and with a particularly large improvement in the capability of the device to be fitted to all the widely-varying designs of different makes and models of passenger cars; and also with a large improvement in the simplicity of installation by mechanics or on a "do-it-yourself" basis by the car owner.

Referring to the dawings, the present invention is shown by way of illustration, as applied to an automotive vehicle to control the throttle and hence the flow of fuel mixture to the engine for establishing the speed thereof. The conventional brake pedal B and accelerator pedal C, biased toward idle by the spring 22, are shown in their operative relation. The term "throttle" as used herein includes the speed control member of any kind of engine. Hence the hand throttle of the present invention is adapted to establish the operating position of the "engine control means," which in addition to the accelerator pedal C includes the throttle (not shown), or its equivalent, including any linkage means between the accelerator and the throttle.

In the illustrated embodiment of the invention, the speed control device 10 (or throttle holder) as illustrated herein is suitably mounted on the instrument panel 12 of the vehicle, as by means of screws 40. A suitable linkage generally indicated as 14 is operatively connected to the suspended accelerator pedal C. Another suitable linkage such as the link 16 operatively connects the speed control means 10 to the brake foot pedal B.

The accelerator linkage 14 includes a rod extension 18 connected to accelerator link 19, preferably made of music wire so that a right angle portion can replace the cotter pin supplied with the vehicle to retain the pin 20. The cable 21 connects to the throttle (not shown) and is biased in an idle direction by the vehicle accelerator spring 22. The accelerator pedal lever 23 is suspended at a hinge-pivot 24 so that depressing pedal C moves linkage 14 to the left, and conversely, as viewed in FIG. 1. The adjustment of the linkage 14 is enabled by a threaded connector 25 having set screws 25a. This suspended accelerator pedal and cable linkage mechanism is now provided on all recent Ford and Mercury automobiles, for example.

The brake link 16 is preferably made of music wire and is connected to the brake release member in the speed control device in a manner to be discussed. The other end of the brake link 16 is inserted through a hole in a lock-piece 26, as shown in FIGS. 1 and 2. The lock-piece 26 includes a threaded hole to enable the piece to fit loosely on a threaded shaft 27 to facilitate angular movements of link 16 when the brake pedal is depressed. The shaft 27 is fastened to the brake arm 28 by suitable means such as by a pair of clamp plates 29 secured by nuts 30 and a bolt 31. The adjustment of the link 16 is enabled by a set screw 26a, to be discussed further after describing the construction of the entire speed control mechanism.

The linkages may be modified in various ways in order to permit the speed control device 10 to be used in conjunction with any of the various conventional accelerator pedal constructions now in use. Thus, by way of example, the linkage 14 can be modified so that it can be used in conjunction with another type of accelerator pedal A shown in FIG. 3. In this type of accelerator construction a hinged lever 32 having a link portion 32a operates the throttle when accelerator A is depressed. An accelerator rod 33 is clamped to lever 32 (which is usually a steel rod) by suitable clamping plates and screws 33a. The accelerator link 19 then connects to the upper end of rod 33, in the same manner as the mechanism of FIG. 1. The operational geometry of the form of FIG. 3 is now the same as that of FIG. 1; when link 19 is pulled by the control device to adjust vehicle speed in a manner to be described, the lever 32 is moved to open the throttle.

Referring to FIGS. 5-10, the detailed construction of the speed control device 10 will now be described. The speed control device includes a stationary portion and a movable portion. The stationary portions include a cup-shaped housing 34 having a mounting plate 36 secured thereto, as by screws or rivets 38. The mounting plate is secured to the underside of the instrument panel by suitable means, as by sheet metal mounting screws 40 (FIG. 1) projecting through slots 42 in plate 36. The stationary portion also includes a screw shaft 44 inserted through holes in end walls 34a and 34b of housing 34, to be supported thereby, for rotary movements of the shaft by a knob 46 suitably secured to shaft 44. The knob includes a tactile indicator 48 for purposes to be described. As shown in FIG. 5, a retainer 50 and a step in shaft 44 at a portion 52 of reduced diameter prevents axial displacement of the shaft 44 while permitting the said rotary movements thereof.

Figure 8:
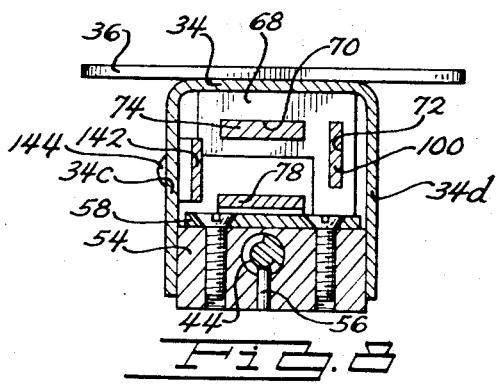
FIGURE 8 is another sectional view taken on the line 8—8 of FIG. 5.

The stationary portion also includes a rectangular latch-block 54 having a bore through which the shaft 44 projects to support the block. The bore of block 54 includes thread means such as a pin 56 secured to the block and projecting into the thread 44a of shaft 44. The block is restrained from rotation by the side walls 34c and 34d as shown in FIG. 8, so that rotation of knob 46 by the vehicle-driver causes pin 56 to travel in the thread 44a to provide longitudinal movement of block 54 for adjustment thereof to any desired position on shaft 44. A T-shaped latch-piece 58 is secured to block 54 by suitable means, as by screws (FIG. 8), to move longitudinally as a part of the block for purposes to be described.

A stationary bracket 60 is secured to housing 34 by suitable means, as by screws or rivets 62, and includes a supporting portion 60a having a pair of slots 64 and 66 formed therein for purposes to be described. The housing 34 includes a down-turned supporting tab 68 having a pair of slots 70 and 72 equal to and located in the same position as the slots 64 and 66, respectively, all as shown in FIGS. 5, 6 and 8.

A slide-support 74 is inserted through slots 64 and 70 to be supported only by the supporting portion 60a and tab 68, respectively, to enable sliding longitudinal movements of the slide-support 74 for purposes to be described. The slide support is connected to linkage 14 for movements therewith through a lost-motion connection 76, as illustrated in the form of the invention disclosed herein, to be discussed further. Hence, the slide support 74 is part of the movable portion of the speed control device because it is operatively connected to the control means and always moves therewith, even when the speed control device is set in its inoperative or "off" position and the driver actuates the accelerator pedal in normal driving.

A detent 78 is connected to the lower end of the slide support 74 by hinged connecting means to enable freely movable angular movements of the detent in relation to the slide support. In the form shown, the hinge connection (shown in FIGS. 4, 5 and particularly 5a) is provided by a tongue 80 which projects downwardly through a slot 82 in the connecting end of detent 78. A retainer such as a "roll-pin" 84 is press inserted in a hole 86 to maintain the hinge assembly. The pin 84 is located to provide a slight clearance between the top of the pin and the bottom of the detent for enabling the detent to pivot freely a limited amount about the hinge connection of the slide support to provide swingable or angular movements of the free end of the detent in relation to the slide support. The free end of detent 78 includes a down-turned abutting portion or catch 88 adapted to engage the abutment surface 58b (FIG. 10) when in the position shown in FIG. 5, to be discussed further.

Thus, with the parts in the position shown in FIG. 5, if knob 46 is rotated clockwise, the block 54 and its latch-piece 58, detent 78, side support 74, linkage 14, and the control means will all be moved to the left in unison (FIG. 1) to advance the control means in the increase-speed direction. When the parts are placed in the positions shown in FIG. 10, in a manner to be discussed, rotation of knob 46 merely slides the extension 58a to the left while the detent catch 88 rests thereon as a result of gravity forces of the detent. Also, as viewed in FIG. 10, when the acccelerator is operated by the driver in normal driving the detent cathc 88 will slide longitudinally on latch-piece 58 including its extension 58a, to be discussed further. Since the detent always moves longitudinally with normal driving movements of the control means, the detent along with the slide support is part of the "movable portion" of the control device.

The lost-motion connection 76 comprises an enlarged head 90 formed in the link 18 which projects through a slot 92 of the slide support (FIG. 5). A retainer 94 which is larger than slot 92 is suitably secured to link 18, as by soldering or pressing at a predetermined distance from the surface of support 74 to provide the lost-motion travel of the slide support in relation to movements of the control means. If this disance is ⅔₂″, for example, the lost-motion action will be ⅔₂″. Thus when the accelerator is depressed, the slide support will not be moved to the left until retainer 94 abuts the right end of the slide support; and when the accelerator is retarded by the driver, the slide support does not move to the right until the head 90 abuts the inside surface of the slide support. The purpose of the lost-motion connection will be explained when discussing the overall operation of the device hereinafter. The slot 92 is long enough to provide a hinge action at connection 76 and to enable angular movements of link 18, to accommodate movements of the accelerator lever 23 as viewed in FIG. 1.

Suitable means are provided for releasing the detent 78 from an active to an inactive position so that spring 22 can urge the accelerator pedal C toward the normal engine idling speed position. The present device also can readily be rendered inoperative so that the normal throttle or speed control of the vehicle will be the only control that affects the speed of the vehicle.

The details of construction of the mechanism for rendering the speed control device either inactive or inoperative from an active status, and conversely, will now be described, whereas the operation will be discussed thereafter. A vertical guide member or plate-piece 96 is mounted and directed by suitable means (to be discussed) to enable freely-slidable vertical movements with respect to the end wall 34b and the slide support 74. The guide member 96 illustrated herein is of plate-like construction and has a slot 98 (FIG. 7) through which the detent 78 passes to enable the longitudinal movements of the detent as described above; but vertical movements of the guide member regulate the angular movements of the detent in relation to the latch abutment 54b, for purposes of and in a manner to be described.

Figure 7:
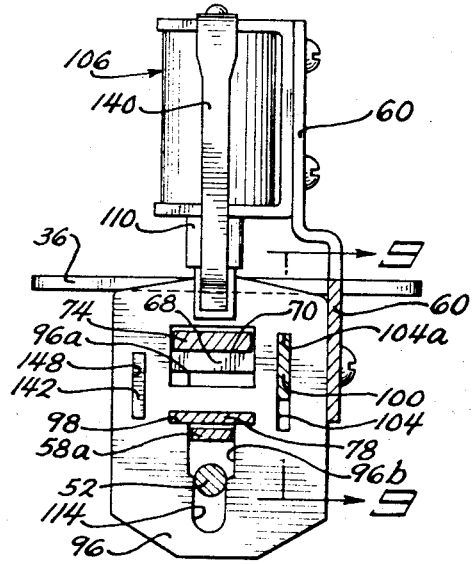
FIGURE 7 is a sectional view taken on the line 7—7 of FIG. 5.
Figure 9:
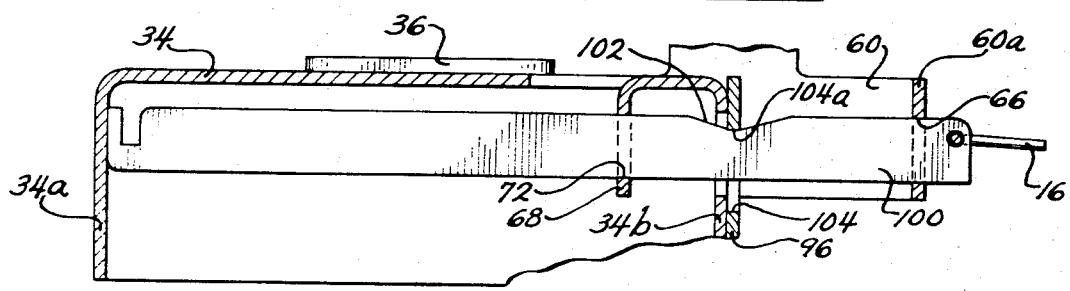
FIGURE 9 is a fragmentary vertical section showing release means connected to the brake means of the vehicle for rendering the device inactive.
Figure 10:
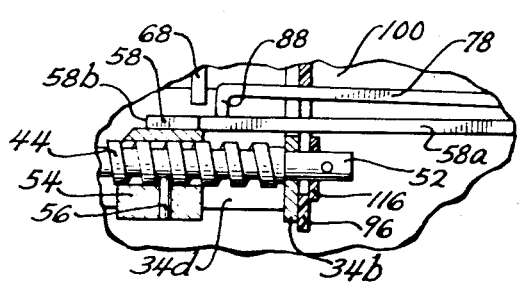
FIGURE 10 is a fragmentary sectional view showing detent means of the device in an inactive position.

The mechanism for moving the detent 78 from its "active" to its "inactive" position is the brake release means, which comprises a cam-piece 100 having a cam portion 102 (FIG. 9) and a cooperating cam-follower surface 104a of a vertical slot 104 in the guide member (FIG. 7). The cam-piece 100 is supported and guided by only the tab 68 and supporting portion 60a to slide in the slots 72 and 66, respectively, as shown best in FIGS. 6, 8 and 9. One end of the cam-piece 100 is connected to link 16 for longitudinal movement in response to movement of the brake pedal B. The cam-piece 100 passes through the slot 104 in the guide member with ample side clearance to enable free vertical movement of the guide member. In the "active" position shown in FIGS. 5 and 9, the surface 104a is adjacent to the bottom of the recess formed by the cam surface 102. When the vehicle-driver depresses brake pedal B, linkage 16 moves cam-piece 100 to the right (FIG. 9), causing the guide member to rise on cam surface portion 102, which raises detent 78 to release from the latch-piece 58 for movement from its "active" position (FIG. 5) to its "inactive" position as shown in FIG. 10. The length of cam-piece 100 is much greater than the travel of the brake arm 23 (at shaft 27) so that the cam-piece cannot be pulled out of the two supporting slots 72 and 66.

Restraining means are provided in two forms to render the speed control device inoperative in response to the movement of an element of the vehicle by the driver. In one form of restraining means shown herein, the guide member is raised from the "active" or "inactive" positions of the detent 78 to a higher position wherein the speed control is rendered "inoperative." One form of restraining means for producing this result includes electromagnetic means such as a solenoid 106 having a coil 108 and an armature 110 slidable therein in a conventional manner. The solenoid 106 is mounted on bracket 60 and secured thereto, as by screws. The armature includes a yoke through which a hinge pin 112 is pressed, or otherwise secured thereto. The pin 112 also passes through a hole in the guide member 96 to support same and enable the armature to raise the guide member when the solenoid is energized. For this purpose, the armature must be freely fitted within the bore of coil 108, and the hole in the guide member must have sufficient clearance to accommodate slight misalignment of the solenoid in production. It can now be seen that the guide member is guided in its vertical movements at two points; one guiding point comprises the pin 112 which in turn is guided by the armature 110; a second guiding point is the shaft extension 52 which projects through a slotted portion 114 of the guide member (FIGS. 6 and 7). A washer 116 is held loosely on shaft extension 52 by a suitable pin to retain the guide member 96 in place while enabling the essential freely sliding vertical movements thereof. The guide member includes large clearance spaces 96a and 96b (FIG. 7) for the slide support 74 and extension 58a, respectively.

Thus, the foregoing construction enables the entire assembly of the armature 110, pin 112, guide member 96 and detent 78 to move in opposition to gravity forces in a vertical direction completely free and unrestricted without binding of any kind, and while enabling the longitudinal movement of detent 78 at all times as above described.

The device is rendered inoperative in the foregoing manner incident to operation of a movable element of the vehicle which is always operated by the driver whenever he inactivates or leaves the vehicle. In the forms shown herein, the "element" comprises any vehicle door which operates a switch in the electric circuit to the dome light of the vehicle. A conventional circuit of this type is shown in FIG. 1 in which a dome light 118 is connected by conductors 120, 122, 124 and 126 to the battery 128. When either of the spring-actuated switches 130 or 132 is closed by opening of either door 134 or 136, respectively, a circuit will close through the solenoid coil via conductor 138 to cause armature 110 to rise for rendering the speed control device inoperative, in a manner described above.

Safety means are provided to hold or maintain the speed control device in the "inoperative" status. Such holding means may comprise any type of latch means to hold the guide member in its inoperative position. In the form illustrated herein such safety means comprises a swingable leaf spring latch 140 suitably secured to the stationary portion such as to solenoid 106, as shown. When the guide member and pin 112 is raised to 112′ (FIG. 5), the latch 140 snaps under catch portion 112a to hold the entire assembly (above described) in the inoperative position.

A second and separate form of restraining means, which is manually operated to render the speed control device 10 inoperative comprises a manually actuated lever 142 which is pivotally mounted on a hinge pin 144 suitably secured to housing wall 34c. The lever extends at the driver's end through a slot 146 in the end wall 34a of housing 34; the lever extends at its other end through a slot 148 in guide member 96 (FIGS. 4, 6, 7 and 8). Whenever the vehicle-driver depresses his end of lever 142, the other end thereof raises the guide member and its connected parts into the inoperative position in which the latch 140 engages the catch 112a to maintain the parts in this position.

The lever also functions as a manually selective release for reactivating the speed control device 10, and hence may be considered as part of the safety means. Reactivation is accomplished by a reverse manual actuation of lever 142 whenever the vehicle-driver decides to set the device ready for activation. In this reverse action, the driver lifts lever 142 which moves the guide member downwardly to overpower the holding action of latch 140. In this action, the latch bends as a result of the applied force causing the lower end of the latch to snap outwardly allowing the catch portion 112a to drop to the solid line position of FIG. 5. The speed control device 10 will then be in its "operative" position either in an "active" or "inactive" setting as may be selected by the operator of the vehicle, to be discussed.

Since the basic construction of the speed control device has been explained, the overall operation of the device will now be described in detail. When the driver enters the vehicle, the speed control device stands in its inoperative status, in which the catch portion 112a is held by the latch 140, both elements being shown in their respective positions at 112' and 140'. After the vehicle is started while at idle, the driver can lift the lever which releases the guide member 96 in a manner previously described. The assembly of the guide member 96, the detent 78 and armature 110 then drops down by gravity to a position depending on the adjusted setting of block 54. If the block is set in the idle position as shown in FIG. 5, the detent will drop directly to the operative or active position. In this event, the speed can be established as follows: the driver depresses the accelerator normally until the desired speed is attained, wherein the catch 88 will stand to the left of latch-piece 58. The driver then rotates knob 46 which moves block 54 leftwardly until the latch-piece abuts the catch 88; the driver can feel the speed control device "take over" and the driver then removes his foot from the accelerator and the vehicle continues at the desired adjusted speed.

If the block 54 is preset to a position corresponding to the desired speed in a manner just described or by other means to be discussed, the detent will drop into the inoperative or ready position when lever 142 is raised, as shown in FIG. 10. Then automatic engagement or activation occurs when the driver depresses the accelerator to move the detent to the left as it slides on the latch-piece 58 and its extension 58a. When the catch 88 passes the left end of the latch-piece, the detent drops down because of gravity forces to strike the top surface of block 54. The detent and block are preferably made of metal so that this striking action produces a "click" signal which is audible to indicate engagement to the driver, which signal is amplified by the sounding-board effect of the instrument panel. The device is now activated, so the driver can remove his foot from the accelerator and the vehicle will continue at the set speed. The speed can be adjusted selectively by the driver at any time while the device is activated merely by rotating knob 46 to the position for the new desired speed. The vehicle speed will change slowly to the new value. If a faster speed-change is desired, the accelerator pedal or brake pedal must be depressed.

The foregoing desirable automatic engagement can be effected in two ways by the driver. First, he can depress the accelerator smoothly but rapidly from an idle position until he hears the "click" signal. This may occur at 10–15 m.p.h. whereas the block 54 may be set for 40–50 m.p.h. Then the vehicle will accelerate automatically but moderately to the speed corresponding to the set position. Thus, it is not necessary to wait for the set speed until the driver removes his foot from the accelerator. If the driver wishes to accelerate the vehicle faster than the moderate rate of automatic acceleration, he uses the second mode of operation, in which he depresses the accelerator and holds it until the desired speed is attained, and then he removes his foot from the accelerator. After the device is activated, the driver can cause the vehicle to exceed the set speed at any time (such as for passing other vehicles) by depressing the accelerator. In this event, the catch 88 leaves the latch abutment 58b and moves leftwardly (FIG. 5), and when the driver removes his foot after passing the other vehicle, the spring 22 returns the parts to the abutting engaged position as shown in FIG. 5. Thus the catch 88 forms a uni-directional abutting connection with latch-piece 58.

When the speed control devices is activated and the brake pedal B is depressed, the cam portion 102 is moved rightwardly, as described above, to raise the guide member 96 and the catch portion 112a to the inactive position as shown in FIG. 10. At this time, the catch 88 is raised just above the latch-piece 58 so that spring 22 instantly snaps the throttle and its connecting linkage to their idle positions. It is very important to understand that the cam portion 102 only raises the catch portion 112a to a position lower than the dotted line position 112', so that the latch 140 never snaps under the catch when the brake pedal is depressed. This construction and arrangement facilitates the highly desirable automatic activation feature. Such automatic re-engagement is effected merely by depressing the accelerator which causes detent 78 to move leftwardly as it slides on latch-piece 58 and its extension 58a. When the catch portion 88 passes the left end of latch-piece 58 (FIG. 10 to FIG. 5) the gravity forces of the detent and its connected parts cause the same to snap into the position shown in FIG. 5; this automatic activation of the device produces the audible click signal, as discussed above, to tell the driver that he can now remove his foot from the accelerator. This activation action is "automatic" in the sense that the driver does not use his hand on the knob or lever, but the engagement is produced entirely incidental to normal advancing movements of the control means; and hence the action is "automatic" because no additional conscious effort is required by the driver. Thus, when the driver depresses the brake pedal, the speed control device releases; and to re-activate the device, the driver merely depresses the accelerator for normal acceleration without other manual operation of any kind, and when he hears the click signal he knows the device is automatically reactivated.

When the speed control device is engaged automatically in the foregoing manner, the lost-motion connection 76 operates to prevent too frequent activation when the vehicle is temporarily following variable-speed traffic at or near the set speed, so it is not necessary to render the device inoperative during this temporary period. This desirable result is accomplished by the lost-motion means which requires that the accelerator and throttle be moved by the driver to a second position beyond the set position in order to move the detent into engagement with the latch-piece. Then when the accelerator is released after the click is heard, the spring 22 causes the lost-motion travel to be taken up until the throttle return to the set position. Thus, in order to effect automatic engagement, it is necessary to depress the accelerator slightly beyond the set position. In this manner, a vehicle can be accelerated a slight amount without causing activation of the speed control device when following close traffic, but automatic activation can be effected as desired when the traffic clears. Of course, the amount of lost-motion can be varied, or even eliminated if desired, merely by setting retainer 94 closer to the end of the slide support 74.

The device is rendered inoperative by the restraining means mechanisms discussed above. Thus, the driver can render the device inoperative at any time by pressing down on lever 142 to raise detent 78 and the catch portion 112a into latching engagement with latch 140, as shown by the dotted lines 112' and 140'. Then the detent is held up clear of the latch-piece 58 by the guide member as the detent slides through slot 98 (FIG. 7); in this inoperative position the slide member and detent always move unrestrictedly with the throttle and its connecting linkage. The same inoperative status is also produced automatically by energizing the solenoid 106, as discussed previously, whenever a vehicle door is opened. This action is "automatic" in the sense that no conscious effort is required by the driver to render the device inoperative, as mentioned previously. The complete operating cycle has now been explained. The device is re-activated in a first step by the next driver only after a conscious effort to raise lever 142 so the driver is not surprised by the automatic engagement (if the restraining means were not included in the combination) when the block 54 is left in a position corresponding to high turnpike speeds, for example.

For safety purposes, I avoid any and all visual means, such as a calibrated dial, for setting the desired speed. I consider it hazardous to invite the driver to remove his sight from the road to look for the proper speed setting, especially at night. This is particularly true because the device is located below the instrument panel, which location would require the driver's sight to deviate an excessive amount from the road. In the improved speed control device of the present invention, the knob 48 with the single tactile indicator adjacent its periphery enables a mode of operation for setting vehicle speed solely by the sense of touch, and which I have called the "Braille" system. For best results with this Braille system, it is desirable for the entire speed range (30 m.p.h. to 75 m.p.h.) to be traversed in about two turns of the knob or less. With the improved speed control device, the indicator 48 can be set at the vertical or 12 o'clock position, and the take-up play adjustment (elements 25 and 25a) enables the block 54 to be set in its zero or idle-speed position in all production units. Then the first two or three turns from the zero position traverse the entire speed range. The single tactile indicator 48 on knob 46 is "felt" by the operator to tell (by touch) its rotary position corresponding to 3, 6, 9 or 12 o'clock, for example, and the speed is noted at each "clock" position. Thereafter, the indicator is set (by feel) to a memorized clock position corresponding to the desired speed. To find the position for any desired speed if the setting has been changed by another driver, it is only necessary to count the turns from the zero position to the memorized "clock" position. For example, if 1½ turns produce 50 m.p.h. vehicle speed, the driver would merely turn the knob back to its zero position and then reverse the knob 1½ turns and the indicator would reside in a 6 o'clock position, all by the sense of touch. When the device is engaged the speed can be changed to any other desired value while driving on turnpikes merely by changing the indicator 48 to the corresponding memorized clock position. In the present improved speed control device, the knob can only be moved in a rotary direction whereas the separate lever 142 determines the operational status of the device.

Now that the overall operation of the speed control device has been explained, several aspects of the mechanism can be better understood. The rotation of knob 46 when the device is activated causes speed-adjusting movements (in unison) of the block 54, latch-piece 58, detent 78, slide support 74, linkage 14 and the engine throttle. It is significant that the block 54 and its latch-piece 58 are considered part of the stationary portion of the device, because they do not move once the knob is set for the desired speed. Thus for automatic activation considerations, the block and latch-piece assembly is in a fixed but adjustable position. By contrast, for the important automatic activation action, the detent, slide support 74 and linkage 14 are part of the movable portion of the device.

It now can be understood that the purpose of the member 96 in all operations is to guide and regulate the movements of the detent 78 in two transverse directions (longitudinal and angular). The guide member regulates all operations as determined by the action of the automatic restraining means (solenoid 106 and related elements), the brake release means (elements 100, 16, 26, 27, etc.), the safety means (latch 140 and catch portion 112a) and the manual restraining means (elements 142 and 144) which may also be considered as part of the safety means. The main purpose of the slide-support 74 is to carry and guide the detent in a consistent longitudinal path while connected to the control means for movements therewith to enable free and unrestricted movements of the detent in a direction transverse to the abutting latch-piece 58 regardless of the forces of the control means transmitted through linkage 14.

From all the foregoing it can be understood how the speed control device of the present invention is more adaptable to all makes and models of automotive vehicles. The detent of the present invention only moves vertically about 1/16" to release when the brake pedal is depressed, and all production adjustments of the detent, the cam action, the solenoid and the latch 140 can be set and sealed at the factory. The mechanic or car owner in the field connects the links 16, 18 and 19 and then merely "takes up play" therein; the linkages are then secured in their adjusted positions by locking the connector 25 and lock-piece 26. I have found that the links 16 and 19 can be made of music wire (about 1/16" dia. for example) which is strong, and they can be supplied in kits long enough for the maximum requirement so that the excess can be clipped off for shorter requirements in other vehicles. The only other requirement for installation is to secure the clamps 29 to the brake arm in a suitable position thereon to enable easy connection and operation of link 16. Also, with accelerators of the type shown in FIG. 3, an additional link, such as element 33 must be secured to the throttle linkage as illustrated.

Numerous reversals of various elements of my speed control device are possible without departing from the spirit of the invention. For example, the device could be reversed to act by compression directly on an extension of the accelerator C, as disclosed in my aforesaid prior patents instead of the tension connection as disclosed in FIG. 1. This may be done merely by reversing the block 54 and latch-piece 58 and removing the catch 88 from detent 78, and also preferably reversing the thread 44a. However, I have found the "tension" arrangement disclosed herein to be much more adaptable, at least to present-day automotive vehicles.

What I claim is:

1. In a control device for an automotive vehicle having an engine and speed control means for said engine operable by manual effort of the vehicle-driver, said vehicle having brake-actuating means, the combination of; a stationary portion of said device adapted to be operatively mounted on a fixed part of the vehicle, movable positioning means operable to cooperate with said stationary portion in abutting connection therewith for holding said control means in a set position independent of said manual effort on the control means by the vehicle-driver, a member operatively associated with said positioning means and said stationary portion and movable to regulate said abutting connection of said positioning means and said stationary portion by controlling the relative movements thereof in at least one direction, said positioning means being disposed in relation to said stationary portion to prevent movements of said control means in a reduce-speed direction from its abutting position corresponding to said abutting connection, but to permit completely unrestricted normal manual movements thereof in either direction at any position on the high speed side of said abutting position of said control means, and release means operable in response to predetermined movement of said brake-actuating means for causing said movement of said member for effecting a release of said abutting connection to render said positioning means inactive for holding said control means in said set position.

2. In a control device for an automotive vehicle having an engine and speed control means for said engine operable by manual effort of the vehicle-driver, said vehicle having brake-actuating means, the combination of; a stationary portion of said device adapted to be operatively mounted on a fixed part of the vehicle, movable positioning means operable to cooperate with said stationary portion for holding said control means in a set position independent of said manual effort on the control means by the vehicle-driver, said positioning means including a slidable support operatively connected to said control means for movements therewith, detent means carried by said support and movable in relation thereto from an active position to a second position for rendering said positioning means inactive for holding said control means in the set position, a movable member operatively associated with said detent means to guide and regulate said detent means in its operative movements in relation to said stationary portion and release means operable in response to predetermined movement of said brake-actuating means for causing movement of said guide member and thereby to cause said relative movement of said detent means from said active position to said second position for rendering said positioning means inactive.

3. The combination of means defined in claim 2, and said stationary portion including latch means adapted to provide an abutment for engagement with said detent means for holding said control means in said set position, and manually operable speed-setting means selectable by the vehicle-driver to adjust the position of said latch means for changing said set position to modify the operating speed of the vehicle.

4. The combination of means defined in claim 2, and said stationary portion including latch means adapted to provide an abutment for engagement with said detent means for holding said control in said set position, manually operable speed-setting means selectable by the vehicle-driver to adjust the position of said latch means for changing said set position to modify the operating speed of the vehicle, and said guide member being arranged to move substantially transverse to the direction of travel of said support in said movements of said member in response to said brake-actuating means movements.

5. The combination of means defined in claim 2, and said stationary portion including latch means adapted to provide an abutment for engagement with said detent means for holding said control means in said set position, manually rotatable speed-setting means selectable by the vehicle-driver to adjust the position of said latch means for changing said set position to modify the operating speed of the vehicle, said speed-setting means including rotatable thread means cooperating with said latch means to provide axial movements thereof by rotation of said speed-setting means.

6. The combination of means defined in claim 2, and said vehicle also including a movable element always operated by the vehicle-driver whenever said driver leaves the vehicle, and said stationary portion including latch means adapted to provide an abutment for engagement with said detent means for holding said control means in said set position, manually rotatable speed-setting means selectable by the vehicle-driver to adjust the position of said latch means for changing said set position to modify the operating speed of the vehicle, said speed-setting means including rotatable thread means cooperating with said latch means to provide axial movements thereof by rotation of said speed-setting means for establishing any desired position of said control means without visual inspection thereof, said rotatable means including knob means having a tactile indicator adjacent its periphery to indicate by the sense of touch the angular position of said knob means to enable the vehicle-driver to select the speed of said vehicle by feeling said angular position of said knob means without removing his sight from the road, and restraining means responsive to said movements of said element automatically to render said positioning means inoperative and incapable of inadvertent operation with respect to said latch means until said positioning means is activated deliberately by the vehicle-driver.

7. In a control device for an automotive vehicle having an engine and speed control means for said engine operable by manual effort of the vehicle-driver, said vehicle having brake-actuating means, the combination of; an adjustable portion of said device adapted to be operatively mounted on a fixed part of the vehicle, movable positioning means operable to cooperate with said adjustable portion for establishing said control means in a controlled position independent of said manual effort on the control means by the vehicle-driver, said positioning means including a slidable support operatively connected to said control means for movements therewith, detent means carried by said support and movable in relation thereto in a direction transverse to the direction of movement of said support, a movable member operatively associated with said detent means to guide and regulate said detent means in its operative movements in relation to said adjustable portion, and release means operable in response to predetermined movement of said brake-actuating means for causing movement of said guide member and thereby to cause said relative transverse movement of said detent means from an active position to a second position for rendering said positioning means inactive for establishing said control means in the controlled position.

8. The combination of means defined in claim 7, and said vehicle including a door movable in opening and closing directions by the vehicle-driver, and said adjustable portion including manually movable means having an adjustable abutment for enabling an abutting connection of said detent means with said abutment for holding said control means in said controlled position, said detent means being constructed and arranged in relation to said abutment to prevent movements of said control means in a reduce-speed direction from its abutting position corresponding to said abutting connection, but to permit completely unrestricted normal manual movements thereof in either direction at any position on the high-speed side of said abutting position of said control means, said release means in said predetermined movement thereof being adapted to render said positioning means inactive but not inoperative, said detent means and said cooperating abutment being constructed and arranged to effect automatically said abutting connection for activating said device after movement of said control means in an increase-speed direction by the vehicle-driver at least to said controlled position, and restraining means responsive to said movements of said door to render said positioning means inoperative and for preventing inadvertent operation of said device by said driver.

9. In a control device for an automotive vehicle having an engine and speed control means for said engine operable by manual effort of the vehicle-driver, said vehicle having brake-actuating means, the combination of; a stationary portion of said device adapted to be operatively mounted on a fixed part of the vehicle, movable positioning means operable to cooperate with said stationary portion for holding said control means in a set position independent of said manual effort on the control means by the vehicle-driver, said positioning means including a slidable support operatively connected to said control means for movements therewith, swingable detent means hingedly connected to said support to provide angular movements in relation thereto in a direction transverse to the direction of movement of said support, a movable member operatively associated with said detent means to guide and regulate said detent means in its operative movements in relation to said stationary portion and release means operable in response to predetermined movement of said brake-actuating means for causing movement of said guide member and thereby to cause said relative movement of said detent means from an active position to a second position for rendering said positioning means inactive for holding said control means in the set position.

10. In a control device for an automotive vehicle having an engine and speed control means for said engine operable by manual effort of the vehicle-driver, said vehicle having brake-actuating means, said vehicle also including a movable element always operated by the vehicle-driver whenever said driver leaves the vehicle, the combination of; an adjustable portion of said device adapted to be operatively mounted on a fixed part of the vehicle, movable positioning means operatively associated with said control means and operable to cooperate with said adjustable portion in abutting connection therewith for establishing said control means in a controlled position independent of said manual effort on the control means by the vehicle-driver, a member operatively associated with said positioning means and said adjustable portion and movable to regulate said abutting connection of said positioning means and said adjustable portion by controlling the relative movements thereof in at least one direction, said positioning means being disposed in relation to said adjustable portion to prevent movements of said control means in a reduce-speed direction from its abutting position corresponding to said abutting connection, but to permit completely unrestricted normal manual movements thereof in either direction at any position on the high speed side of said abutting position of said control means, release means operable in response to predetermined movement of said brake-actuating means for causing said movement of said member for effecting a release of said abutting connection to render said positioning means inactive to establish said control means in said controlled position, and restraining means responsive to said movements of said element automatically to render said positioning means inoperative and incapable of inadvertent operation with respect to said control means until said positioning means is activated deliberately by the vehicle-driver.

11. The combination of means defined in claim 10, and said positioning means and said adjustable portion including means providing a cooperative detent latching action for establishing said abutting connection, and said last-named detent latching means being constructed and arranged to provide an audible signal incident to said cooperative latching action when establishing said abutting connection to advise said driver audibly that said device is in operation, wherein the driver can then remove his foot from holding said control means.

12. The combination of means defined in claim 10, and said positioning means being operatively connected to said control means for movements therewith in a second direction transverse to said first-named one direction when providing relative movements of said positioning means and said stationary portion while same is out of said abutting connection, and cam means cooperating with said member and operated by said brake-actuating means upon said predetermined movement thereof to effect movement of said member in said first-named direction to cause said release of said abutting connection.

13. The combination of means defined in claim 7, and said vehicle having biasing means acting on said control means in an idle-speed direction, and said positioning means including means to effect automatically the activation of said positioning means with respect to said adjustable portion only after movement of said control means in an increase-speed direction by the vehicle-driver to a second position a predetermined distance on the high-speed side of said controlled position, and lost-motion means operatively associated with said positioning means and said adjustable portion to enable said biasing means after said activation to cause said positioning means to move in an idle-speed direction into abutting connection with said adjustable portion for holding said control means in said controlled position.

14. In a control device for an automotive vehicle having an engine and speed control means for said engine operable by manual effort of the vehicle-driver, said vehicle having brake-actuating means, said vehicle also including a movable element always operated by the vehicle-driver whenever said driver leaves the vehicle, the combination of; a stationary portion of said device adapted to be operatively mounted on a fixed part of the vehicle, movable positioning means operable to cooperate with said stationary portion for holding said control means in a set position independent of said manual effort on the control means by the vehicle-driver, a member operatively associated with said positioning means to guide and regulate said positioning means in its operative movements in relation to said stationary portion, release means operable in response to predetermined movement of said brake-actuating means for causing operation of said guide member to temporarily render said positioning means inactive but not inoperative for holding said control means in said set position, said positioning means including means to effect automatically the activation of said positioning means with respect to said stationary portion after movement of said control means in an increase-speed direction by the vehicle-driver at least to said set position, and restraining means responsive to said movement of said element automatically to render said positioning means inoperative and incapable of inadvertent operation with respect to said stationary portion until said positioning means is activated deliberately by the vehicle-driver.

15. In a control device for an automotive vehicle having an engine and speed control means for said engine operable by manual effort of the vehicle-driver, said vehicle having at least one door movable to open and closed positions and having brake-actuating means, the combination of; a stationary portion of said device adapted to be operatively mounted on a fixed part of the vehicle, movable positioning means operatively connected to said control means for movements therewith in a speed-controlling direction, said positioning means including means operable to cooperate with said stationary portion in abutting connection therewith for holding said control means in a set position independent of said manual effort on the control means by the vehicle-driver, a member operatively associated with said positioning means and movable in a direction transverse to said speed-controlling direction to regulate said abutting connection and to guide said operative movements of said positioning means in relation to said stationary portion in said speed-controlling direction, said positioning means being disposed in relation to said stationary portion to prevent movements of said control means in a reduce-speed direction from its abutting position corresponding to said abutting connection, but to permit completely unrestricted normal manual movements thereof in either direction at any position on the high-speed side of said abutting position of said control means, release means operable in response to predetermined movement of said brake-actuating means for causing said movement of said guide member in said transverse direction to render said positioning means inactive for holding said control means in said set position, and restraining means operated automatically by said movement of said door to render said positioning means inoperative with respect to said control means.

16. In a control device for an automotive vehicle having an engine and speed control means for said engine operable by manual effort of the vehicle-driver, said vehicle having at least one door movable to open and closed positions and having brake-actuating means, the combination of; a stationary portion of said device adapted to be operatively mounted on a fixed part of the vehicle, movable positioning means operable to cooperate with said stationary portion for holding said control means in a set position independent of said manual effort on the control means by the vehicle-driver, a member operatively associated with said positioning means to guide and regulate said positioning means in its operative movements in relation to said stationary portion, release means operable in response to predetermined movement of said brake-actuating means for causing operation of said guide member to render said positioning means inactive for holding said control means in said set position, restraining means operated automatically by said movement of said door to render said positioning means inoperative with respect to said control means, and safety means operatively associated with said automatic restraining means to maintain said positioning means in said inoperative status when said door is again closed.

17. In a control device for an automotive vehicle having an engine and speed control means for said engine operable by manual effort of the vehicle driver, said vehicle having at least one door movable by the driver to open and closed positions and also having brake-actuating means, the combination of; a stationary portion of said device adapted to be operatively mounted on a fixed part of the vehicle, movable positioning means operatively associated with said control means and operable to cooperate with said stationary portion for holding said control means in a set position independent of said manual effort on the control means by the vehicle-driver, a movable member operatively associated with said positioning means to guide and regulate said positioning means in its operative movements in relation to said stationary portion, release means operable in response to predetermined movement of said brake-actuating means for causing said movement of said guide member to temporarily render said positioning means inactive but not inoperative for holding said control means in set position, said positioning means including means to effect automatically the activation of said positioning means in relation to said stationary portion after movement of said control means in an increase-speed direction by the vehicle-driver at least to said set position, and restraining means operable in response to said movements of said door automatically to render said positioning means inoperative with respect to said stationary portion.

18. The combination of means defined in claim 17, and said restraining means being adapted to cause said movement of said guide member in said response to said movements of said door for precluding said abutting connection in rendering said positioning means inoperative, and manually operated restraining means operable by the vehicle-driver independently of said release means to cause said movement of said guide member for enabling the vehicle-driver at any time to deliberately render said positioning means inoperative for holding said control means in said set position.

19. In a control device for an automotive vehicle having an engine and speed control means for said engine operable by manual effort of the vehicle-driver, said vehicle having brake-actuating means, the combination of; a stationary portion of said device adapted to be operatively mounted on a fixed part of the vehicle, movable positioning means operable to cooperate with said stationary portion for holding said control means in a set position independent of said manual effort on the control means by the vehicle-driver, a movable member operatively associated with said positioning means to guide and regulate said positioning means in its operative movements in relation to said stationary portion, and cam release means operable in response to predetermined movement of said brake-actuating means to act on said movable member for moving said positioning means to an inactive position to preclude said control means from being held in said position.

20. In a control device for an automotive vehicle having an engine and speed control means for said engine operable by manual effort of the vehicle-driver, said vehicle having brake-actuating means, the combination of; a stationary portion of said device adapted to be operatively mounted on a fixed part of the vehicle, movable positioning means operatively associated with said control means and operable to cooperate with said stationary portion for holding said control means in a set position independent of said manual effort on the control means by the vehicle-driver, a movable member operatively associated with said positioning means to guide and regulate said positioning means in its operative movements in relation to said stationary portion, release means operable in response to predetermined movement of said brake-actuating means for causing movement of said guide member to render said positioning means inactive for holding said control means in said set position, and manually operated restraining means operable independently of said release means for causing movement of said guide member for enabling the vehicle-driver at any time to deliberately render said positioning means inoperative for holding said control means in said set postion.

21. In a control device for an automotive vehicle having an engine and speed control means for said engine operable by manual effort of the vehicle-driver, said vehicle having brake-actuating means, said vehicle also including a movable element always operated by the vehicle-driver whenever said driver leaves the vehicle, the combination of; a stationary portion of said device adapted to be operatively mounted on a fixed part of the vehicle, movable positioning means operatively connected to said control means for movements therewith in a speed-controlling direction, said positioning means including detent means operable to cooperate with said stationary portion in abutting connection therewith for holding said control means in a set position independent of said manual effort on the control means by the vehicle-driver, a member operatively associated with said detent means and movable in a direction transverse to said speed-controlling direction to regulate said abutting connection and to guide said operative movements of said detent means in relation to said stationary portion in said speed-controlling direction, said stationary portion including latch means operable to provide an abutment for engagement with said detent means into said abutting connection to hold said control means in said set position, release means operable in response to predetermined movement of said brake-actuating means for causing movement of said guide member in said transverse direction from an active position to a second predetermined position thereof to temporarily render said positioning means inactive but not inoperative for holding said control means in said set position, said detent means and said stationary portion including means to effect automatically the operative engagement of said positioning means and said abutment after movement of said control means in an increase-speed direction by the vehicle-driver at least to said set position, and restraining means responsive to said movement of said element to cause said transverse movement of said member to a third predetermined position thereof for automatically rendering said detent means inoperative and incapable of inadvertent operation with respect to said abutment until said positioning means is activated deliberately by the vehicle-driver.

22. The combination of means defined in claim 21, and safety means operatively associated with said automatic restraining means to maintain said detent means in said inoperative third position in relation to said latch means after said driver leaves the vehicle, and manually operated restraining means to cause movement of said member to said active position for enabling the vehicle-driver to deliberately release said detent means from said inoperative third position, and for enabling the vehicle-driver at any time to deliberately cause movement of said guide member to said third predetermined position for manually rendering said detent means inoperative to hold said control means in said set position.

23. In a control device for an automotive vehicle having an engine and speed control means for said engine operable by manual effort of the vehicle-driver said vehicle having brake-actuating means, said vehicle-driver whenever said driver leaves the vehicle, the combination of; a stationary portion of said device adapted to be operatively mounted on a fixed part of the vehicle, movable positioning means operable to cooperate with said stationary portion for holding said control means in a set position independent of said manual effort on the control means by the vehicle-driver, a member operatively associated with said positioning means to guide and regulate said positioning means in its operative movements in relation to said stationary portion, release means operable in response to predetermined movement of said brake-actuating means for causing operation of said guide member to temporarily render said positioning means inactive but not inoperative for holding said control means in said set position, said positioning means including means to effect automatically the activation of said positioning means with respect to said stationary portion after movement of said control means in an increase-speed direction by the vehicle-driver at least to said set position, restraining means responsive to said movement of said element for operating said guide member automatically to render said positioning means inoperative and incapable of inadvertent operation with respect to said stationary portion until said positioning means is activated deliberately by the vehicle-driver, safety means including latch means operatively associated with said guide member and said automatic restraining means to maintain said positioning means in said inoperative status when said door is again closed, and manually operable means operatively associated with said safety means for operating said guide member to enable the vehicle-driver to deliberately cause said member to release from said latch means.

24. In a control device for an automotive vehicle having an engine and speed control means for said engine, said vehicle also having brake-actuating means and having at least one door manually movable by the vehicle-driver, said vehicle also including an electric circuit having a source of electric energy and an electric light in said circuit mounted in the interior of the vehicle and switch means in said circuit operated by the door when opened to energize said light and to de-energize said light when said door is closed, the combination comprising; a stationary portion of said device adapted to be operatively mounted on a fixed part of the vehicle, movable positioning means operable to cooperate with said stationary portion for holding said control means in a set position independent of said manual effort on the control means by the vehicle-driver, a movable member operatively associated with said positioning means to guide and regulate said positioning means in its operative movements in relation to said stationary portion, release means operable in response to predetermined movement of said brake-actuating means for causing movement of said guide member to render said positioning means inactive for holding said control means in said set position, and restraining means including electro-magnetic means in said circuit operated by said switch means when said door is opened for automatically causing said movement of said member to render said positioning means inoperative with respect to said stationary portion and said control means.

25. In a control device for an automotive vehicle having an engine and speed control means for said engine operable by manual effort of the vehicle-driver and normally urged toward the idle-speed position by biasing means, said vehicle having brake-actuating means, said vehicle also including a movable element always operated by the vehicle-driver whenever said driver leaves the vehicle, the combination of; a stationary portion of said device adapted to be operatively mounted on a fixed part of the vehicle, movable positioning means operable to cooperate with said stationary portion for holding said control means in a predetermined set position independent of said manual effort on the control means by the vehicle-driver, a movable member operatively associated with said positioning means to guide and regulate said positioning means in its operative movements in relation to said stationary portion, release means operable in response to predetermined movement of said brake-actuating means for causing operation of said guide member to temporarily render said positioning means inactive but not inoperative for holding said control means in said predetermined set position, said positioning means including means to effect automatically the activation of said positioning means with respect to said stationery portion after movement of said control means in an increase-speed direction by the vehicle-driver to a second predetermined position beyond said set position, lost-motion means operatively associated with said positioning means to enable said biasing means after said activation to move said positioning means in an idle-speed direction from said second predetermined position to said set position for holding said control means in said set position, and restraining means responsive to said movement of said element automatically to render said positioning means inoperative and incapable of inadvertent operation with respect to said stationary portion until said positioning means is activated deliberately by the vehicle-driver.

26. In a control device for an automotive vehicle having an engine and a speed control means for said engine operable by manual effort of the vehicle-driver, said vehicle having brake-actuating means, the combination of; a stationary portion of said device adapted to be operatively mounted on a fixed part of the vehicle, movable positioning means including detent means operable to cooperate with said stationary portion for holding said control means in a set position independent of said manual effort on the control means by the vehicle-driver, a movable member operatively associated with said detent means to guide and regulate said detent means in its operative movements in relation to said stationary portion, release means operable in response to predetermined movement of said brake-actuating means for causing operation of said guide member and said detent means to render said positioning means inactive for holding said control means in said set position, and manually operated speed-setting means separate from said detent means and operatively associated with said stationary portion for adjusting same to establish the operating speed of the vehicle when said device is in operation.

27. In a control device for an automotive vehicle having an engine and speed control means for said engine operable by manual effort of the vehicle-driver, said vehicle having brake-actuating means, the combination of; a stationary portion of said device adapted to be operatively mounted on a fixed part of the vehicle, movable positioning means operable to cooperate with said stationary portion for holding said control means in a set position independent of said manual effort on the control means by the vehicle-driver, a member operatively associated with said positioning means to guide and regulate said positioning means in its operative movements in relation to said stationary portion, release means operable in response to predetermined movement of said brake-actuating means for causing operation of said guide member to render said positioning means inactive for holding said control means in said set position, manually actuated restraining means operable independently of said release means and acting on said guide member for enabling the vehicle-driver at any time to deliberately render said positioning means inoperative for holding said control means in said set position, and manually actuated speed-setting means operable independently of said manually actuated restraining means and operatively associated with said stationary portion for enabling the vehicle-driver to adjust same for establishing the operating speed of the vehicle when said device is in operation.

28. In a control device for an automotive vehicle having an engine and speed control means for said engine operable by manual effort of the vehicle-driver, said vehicle having brake-actuating means, said vehicle also including a movable element always operated by the vehicle-driver whenever said driver leaves the vehicle, the combination of; a stationary portion of said device adapted to be operationally mounted on a fixed part of the vehicle, movable positioning means including detent means operable to cooperate with said stationary portion for holding said control means in a set position independent of said manual effort on the control means by the vehicle-driver, a movable member operatively associated with said positioning means to guide and regulate said detent means in its operative movements in relation to said stationary portion, completely positive mechanical release means disposed for direct operative connection of said brake-actuating means and said detent means and operable in response to predetermined movement of said brake-actuating means for causing movement of said guide member and said detent means to temporarily render said positioning means inactive but not inoperative for holding said control means in said set position, said detent means and said cooperating stationary portion being constructed and arranged to effect automatically the activation of said positioning means with respect to said stationary portion after movement of said control means in an increase speed direction by the vehicle-driver at least to said set position, and restraining means responsive to said movement of said element automatically to render said positioning means inoperative and incapable of inadvertent operation with respect to said stationary portion until said positioning means is activated deliberately by the vehicle-driver.

29. In a control device for an automotive vehicle having an engine and control means for said engine and having brake-actuating means, said vehicle also including a movable element always operated by the vehicle-driver whenever said driver leaves the vehicle; the combination of, means operable in an active status to regulate the position of said control means for establishing and controlling vehicle speed independent of manual effort on the control means by said driver, a movable member operatively associated with said positioning means to guide and regulate said positioning means in its operative movements in relation to said control means, release means operatively associated with said brake-actuating means for causing operation of said member from said active status to at least temporarily inactivate said positioning means with respect to said control means after a predetermined movement of said brake-actuating means, said positioning means including means operatively connected to said control means for movements therewith to effect automatic activation of said positioning means for providing said regulation of the position of said control means after movement of said control means in an increase-speed direction by the vehicle-driver, restraining means for causing operation of said guide member in response to said movements of said element in one direction to automatically render said positioning means inoperative and incapable of inadvertent operation with respect to said control means until said positioning means is activated deliberately by the vehicle-driver.

30. In a control device for an automotive vehicle having an engine and control means for said engine and having brake-actuating means, said vehicle also including a movable element always operated by the vehicle-driver whenever said driver leaves the vehicle, the combination of; means operable in an active status to regulate the position of said control means for establishing and controlling vehicle speed independent of manual effort on the control means by said driver, a movable member operatively associated with said positioning means to guide and regulate said positioning means in its operative movements for establishing the operating status thereof, release means operatively associated with said brake-actuating means for causing operation of said member from said active status to at least temporarily inactivate said positioning means with respect to said control means after a predetermined movement of said brake-actuating means, said positioning means including means operatively connected to said control means for movements therewith to effect automatic activation of said positioning means for providing said regulation of the position of said control means only after movement of said control means in an increase-speed direction by the vehicle-driver, restraining means for causing movement of said guide member in response to said movements of said element in one direction to automatically render said positioning means inoperative and incapable of inadvertent operation with respect to said control means until said positioning means is activated deliberately by the vehicle-driver, safety means operatively associated with said automatic restraining means and automatically initiated by operation thereof to maintain said positioning means in said inoperative status when said element is moved in a direction reverse from said last-named direction, and manually operable restraining means operatively associated with said safety means to cause said movement of said guide member for enabling the vehicle-driver at any time to deliberately render said positioning means inoperative for regulating said control means irrespective of operation of said automatic restraining means.

31. In a control device for an automotive vehicle having an engine and control means for said engine and having brake-actuating means, said vehicle also including at least one door movable to open and closed positions, the combination of; means operable in an active status to regulate the position of said control means for establishing and controlling vehicle speed independent of manual effort on the control means by said driver, a member operatively associated with said positioning means to guide and regulate said positioning means in its operative movements for establishing the operating status thereof, release means operatively associated with said brake-actuating means for causing operation of said member from said active status to at least temporarily inactivate said positioning means with respect to said control means after a predetermined movement of said brake-actuating means, said positioning means including means operatively connected to said control means for movements therewith to effect automatic activation of said positioning means for providing said regulation of the position of said control means after movement of said control means in an increase-speed direction by the vehicle-driver, restraining means for causing operation of said guide member in response to said movements of said door to automatically render said positioning means inoperative and incapable of inadvertent operation with respect to said control means until said positioning means is activated deliberately by the vehicle driver, safety means operatively associated with said automatic restraining means and automatically initiated by operation thereof to maintain said positioning means in said inoperative status when said door is again closed, and manually operable means adapted to operate said guide member to enable the vehicle-driver at any time to deliberately release said positioning means from said inoperative status.

32. In a control device for an automotive vehicle having an engine and control means for said engine and having brake-actuating means, said vehicle also including a movable element always operated by the vehicle-driver whenever said driver leaves the vehicle, the combination of; means operable in an active status to regulate the position of said control means for establishing and controlling vehicle speed independent of manual effort on the control means by said driver, a movable member operatively associated with said positioning means to guide and regulate said positioning means in its operative movements for establishing the operating status thereof, release means operable in response to movements of said brake-actuating means for effecting movement of said guide member to at least temporarily inactivate said positioning means with respect to said control means, said positioning means including means to effect automatic activation of said positioning means for providing said regulation of the position of said control means after movement of said control means in an increase-speed direction by the vehicle-driver, restraining means operatively connected to said guide member for causing said movement thereof in response to said movement of said element in one direction to automatically render said positioning means inoperative with respect to said control means, safety means activated by operation of said automatic restraining means and including holding means operable for operative connection with said member to maintain said positioning means in said inoperative status when said element is moved in a direction reverse from said last-named direction, and manual restraining means operatively connected to said guide member to effect movement thereof and manually operable deliberately by said vehicle-driver to overpower said holding means for releasing said positioning means from said inoperative status, and for enabling the driver at any time to deliberately cause said movement of said member for manually rendering said positioning means inoperative to regulate the position of said control means.

33. The combination of means defined in claim 32, and said holding means comprises latch means for cooperating with said guide member to maintain same in its inoperative position, and said automatic restraining means and said safety means and said manually operable restraining means all being constructed and arranged to be operable independently of said brake-actuating means, and said manual restraining means in said last named movement of said member being constructed and arranged to be operable independently of said automatic restraining means.

34. The combination of means defined in claim 32, and a manually adjustable portion of said device including latch means and adapted to be operatively mounted on a fixed part of the vehicle, and said positioning means including a slide support operatively connected to said control means for movements therewith in a speed-controlling direction, said activating means including detent means carried by said support and slidable through said guide member and supported thereby for enabling said movements of said detent means in said speed-controlling direction, said detent means being adapted to cooperate with said latch means in abutting connection therewith for holding said control means in said regulated position, said detent means being disposed in relation to said abutment to prevent movements of said control means in a reduce-speed direction from its abutting position corresponding to said abutting connection, but to permit completely unrestricted normal manual movements thereof in either direction at any position on the high-speed side of said abutting position of said control means, said guide member when operated in response to said predetermined movement of said brake-actuating means being adapted to effect movement of said detent means out of said abutting connection completely free of said adjustable portion for enabling said detent means and said control means to move in said speed-controlling direction toward the idle-speed position in a path of travel completely clear of said latch means, and said detent means cooperating with said adjustable portion to enable said automatic activation by re-establishing said abutting connection after said movement of said control means and said cooperating detent means by the vehicle-driver in said increase-speed direction at least to said regulated position.

35. In a control device for an automotive vehicle having an engine and control means for said engine, said vehicle also having brake-actuating means and having at least one door manually movable by the vehicle-driver in opening and closing directions, said vehicle also including an electric circuit having a source of electric energy and an electric light in said circuit mounted in the interior of the vehicle and switch means in said circuit operated by the door when opened to energize said light and to de-energize said light when said door is closed, the combination comprising; means operable in an active status to regulate the position of said control means for establishing and controlling vehicle speed independent of manual effort on the control means by said driver, a member operatively associated with said positioning means to guide and regulate said positioning means in its operative movements for establishing the operating status thereof, release means operatively associated with said brake-actuating means for causing operation of said guide member from said active status to at least temporarily inactivate said positioning means with respect to said control means after a predetermined movement of said brake-actuating means, said positioning means including means operatively connected to said control means for movements therewith to effect automatic activation of said positioning means for providing said regulation of the position of said control means after movement of said control means in an increase-speed direction by the vehicle-driver, restraining means including electromagnetic means in said circuit operated by said switch means when said door is opened for causing operation of said member in response to said opening movements of said door to automatically render said positioning means inoperative with respect to said control means, and safety means operatively associated with said automatic restraining means to maintain said positioning means in said inoperative status when said door is moved in a closing direction.

36. The combination of means defined in claim 9, and said detent means being constructed and arranged for abutting connection with said stationary portion in said set position when said device is activated, and in which said release means includes a cam member movable in said direction of movement of said support, and said guide member comprising a plate-piece freely slidable in said transverse direction and having at least two apertures, said detent means being adapted to project through one of said apertures with a close but freely-sliding fit in relation thereto for providing said guided movements of said detent means in said direction of movement of said support and for providing said regulated angular movements of said detent means as a result of said transverse movements of said plate-piece, said cam member being adapted to project through the second of said apertures with a freely-sliding fit in relation thereto, said cam member including a cam surface contacting a wall of said second-named aperture to cause said transverse movements of said plate-piece in response to said movement of said brake-actuating means for moving said detent means clear of the path of travel of said stationary portion to preclude said abutting connection until further action is taken by the vehicle-driver.

References Cited
UNITED STATES PATENTS

| | | | |
|---|---|---|---|
| 2,477,865 | 8/1949 | DuCharme | 192—3 |
| 2,711,235 | 6/1955 | Pokorny | 192—3 |
| 2,890,596 | 6/1959 | Hatchett | 192—3 |
| 2,917,142 | 12/1959 | Thorner | 192—3 |
| 3,100,021 | 8/1963 | Maurer et al. | 192—3 |
| 3,168,933 | 2/1965 | Thorner | 192—3 X |
| 3,168,942 | 2/1965 | Thorner | 192—3 |

KENNETH H. BETTS, *Primary Examiner.*